United States Patent
Kidston et al.

(10) Patent No.: US 9,238,412 B2
(45) Date of Patent: Jan. 19, 2016

(54) NORMALIZING DECELERATION OF A VEHICLE HAVING A REGENERATIVE BRAKING SYSTEM

(71) Applicant: GM GLOBAL TECHNOLOGY OPERATIONS LLC, Detroit, MI (US)

(72) Inventors: Kevin S. Kidston, New Hudson, MI (US); Eric E. Krueger, Chelsea, MI (US); John C. Haraf, Swartz Creek, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 14/218,302

(22) Filed: Mar. 18, 2014

(65) Prior Publication Data

US 2015/0266383 A1    Sep. 24, 2015

(51) Int. Cl.
| | |
|---|---|
| *B60L 7/26* | (2006.01) |
| *B60T 8/52* | (2006.01) |
| *B60T 13/58* | (2006.01) |
| *B60L 11/18* | (2006.01) |

(52) U.S. Cl.
CPC ... *B60L 7/26* (2013.01); *B60T 8/52* (2013.01); *B60T 13/586* (2013.01); *B60L 11/1861* (2013.01); *B60T 2270/604* (2013.01)

(58) Field of Classification Search
CPC ... B60T 13/586; B60T 2270/604; B60T 8/52; B60L 7/26
USPC .......................................................... 701/70
See application file for complete search history.

(56) References Cited

U.S. PATENT DOCUMENTS

| | | | | |
|---|---|---|---|---|
| 4,962,969 A | * | 10/1990 | Davis | 303/3 |
| 5,615,933 A | | 4/1997 | Kidston et al. | |
| 5,895,100 A | * | 4/1999 | Ito et al. | 303/152 |
| 6,086,166 A | * | 7/2000 | Fukasawa | 303/152 |
| 6,120,115 A | * | 9/2000 | Manabe | 303/152 |
| 6,126,251 A | * | 10/2000 | Yoshii et al. | 303/152 |
| 6,318,487 B2 | * | 11/2001 | Yanase et al. | 180/65.245 |

(Continued)

FOREIGN PATENT DOCUMENTS

| | | | | | |
|---|---|---|---|---|---|
| JP | 11115744 A | * | 4/1999 | | B60T 13/66 |
| JP | 2001359202 A | * | 12/2001 | | B60L 7/24 |

(Continued)

OTHER PUBLICATIONS

JPO machine translation of JP 2009-154865 (original JP document published Jul. 16, 2009).*

*Primary Examiner* — Behrang Badii
*Assistant Examiner* — David Testardi
(74) *Attorney, Agent, or Firm* — Ingrassia Fisher & Lorenz, P.C.

(57) ABSTRACT

A method of operating a vehicle having a friction braking system and a regenerative braking system is presented here. The method determines a regenerative torque capacity, calculates a desired regenerative torque amount for the braking system, detects that the desired regenerative torque amount exceeds the regenerative torque capacity by at least a threshold amount, and controls actuation of the friction braking system in response to the detecting. Another operating method determines a coastdown torque capability of the vehicle, calculates a desired coastdown torque amount, detects that the desired coastdown torque amount exceeds the coastdown torque capability by at least a threshold amount, and controls actuation of the friction braking system in response to the detecting.

18 Claims, 4 Drawing Sheets

(56) References Cited

U.S. PATENT DOCUMENTS

| | | | |
|---|---|---|---|
| 6,325,470 B1* | 12/2001 | Schneider | 303/152 |
| 6,378,636 B1* | 4/2002 | Worrel | 180/65.25 |
| 8,190,344 B2 | 5/2012 | Krueger et al. | |
| 8,947,025 B2* | 2/2015 | Hatsumi et al. | 318/139 |
| 2003/0184156 A1* | 10/2003 | Hilbert | 303/152 |
| 2005/0151420 A1* | 7/2005 | Crombez et al. | 303/152 |
| 2005/0269875 A1* | 12/2005 | Maki et al. | 303/152 |
| 2013/0304344 A1* | 11/2013 | Abe | 701/70 |
| 2014/0095046 A1* | 4/2014 | Nishio et al. | 701/81 |
| 2014/0144728 A1* | 5/2014 | Szeto | 188/1.11 R |

FOREIGN PATENT DOCUMENTS

| | | | | |
|---|---|---|---|---|
| JP | 2004225564 A | * | 8/2004 | F02D 29/02 |
| JP | 2009154865 A | * | 7/2009 | |
| JP | 2011063145 A | * | 3/2011 | |

* cited by examiner

NORMALIZING DECELERATION OF A VEHICLE HAVING A REGENERATIVE BRAKING SYSTEM

TECHNICAL FIELD

Embodiments of the subject matter described herein relate generally to the operation of automobiles when deceleration from the driveline is reduced or unavailable. More particularly, embodiments of the subject matter relate to methodologies for operating hybrid and electric vehicles having regenerative braking systems, vehicles having dual dry clutch transmissions, and the like.

BACKGROUND

Automobile drivelines generally provide some level of deceleration when the driver releases the accelerator pedal. In conventional internal combustion vehicles with automatic and manual transmissions, this is a function of the transmission gear and the amount of engine drag, and is always present. In hybrid/electric vehicles, this is provided by regenerative braking torque used to recharge a battery, which provides power to a traction motor to propel the vehicle. In some vehicles, particularly hybrid/electric vehicles and vehicles with dual dry clutch transmissions, the amount of driveline deceleration can be reduced or unavailable depending on various parameters.

The popularity of hybrid electric, plug-in hybrid, and fully electric vehicles continues to increase over time. Accordingly, the prior art is replete with different systems, control technologies, and processes related to the operation of such vehicles. A hybrid electric vehicle (HEV) includes a rechargeable energy storage system (ESS) which is usually configured as a rechargeable battery or battery pack having a relatively high energy density. An HEV can also include a gasoline, diesel, or alternative fuel internal combustion engine. Other vehicle designs may employ a fuel cell and/or another power source in place of or in conjunction with an internal combustion engine in order to further reduce vehicle emissions and improve the operating range of the vehicle. A fully electric vehicle (EV) only includes an electric drive train, e.g., an electric motor and an ESS.

In certain HEV and EV designs, the drive wheels of the vehicle remain continuously connected to the driveline to enable regenerative braking capability, thus providing a relatively efficient means of capturing useful and otherwise wasted braking energy during coastdown and/or during active braking. As is known in the art, an electric motor/generator (MOGEN) can be selectively operated in such a manner as to allow the device to act as a generator during coastdown or an active regenerative braking event. When acting as a generator, the electric MOGEN recharges the ESS while applying a negative torque to the drive wheels and/or the drive shaft, thus electronically slowing the vehicle. The electric MOGEN likewise can be selectively operated as an electric motor, thus drawing stored electrical energy from the ESS as needed to propel the vehicle.

Regeneration during coastdown or active braking contributes to the deceleration of the vehicle. In this regard, negative coastdown regenerative torque can be applied to mimic the engine drag characteristics of a traditional non-electric vehicle. Moreover, negative braking regenerative torque can be applied as a function of brake pedal travel to mimic the characteristics of a standard vacuum-based hydraulic brake system. In practice, braking regenerative torque can be applied as an additive torque to the friction brake torque (which is generated in response to driver actuation of the brake pedal), which allows lower cost and complexity as opposed to fully-blended regenerative braking systems.

In certain situations, the vehicle may have little to no capacity to handle regenerative torque. For example, if the high voltage ESS is fully charged (or has a sufficiently high state of charge), then regenerative torque may be unavailable. As another example, during wheel slip conditions the regenerative braking system may be temporarily disabled to enable an automatic braking system, a traction control system, and/or other systems to immediately initiate and operate. Also cases in which multiple-mode hybrid transmissions shift between modes/gears. In other scenarios, it may not be possible to carry regenerative torque through a shifting operation (or it may be desirable to inhibit regenerative torque during shifting for various reasons, e.g., to reduce noise or vibration). When regenerative torque is unavailable for any reason, then the actual vehicle deceleration will be less than expected due to the loss of deceleration: the coastdown regenerative torque and the additive braking regenerative torque. The perceived difference in deceleration is a function of the normal levels of regenerative torque. For example, if the coastdown deceleration is calibrated to a higher level to allow one pedal driving, then the loss of regenerative torque will be more noticeable than if it were calibrated to a more traditional value in line with engine drag.

Similarly, in some non-hybrid vehicles such as vehicles with dual dry clutch transmissions, the deceleration from the driveline may be unavailable. In the case of dual dry clutch transmissions, the clutch may become overheated and will therefore be forced to open. The deceleration due to engine drag will then not be transmitted to the drive axle. In this case, the application of the friction brakes will restore the feeling of normal coastdown deceleration.

Accordingly, it is desirable to have a vehicle control system that addresses the scenarios mentioned above. Furthermore, other desirable features and characteristics will become apparent from the subsequent detailed description and the appended claims, taken in conjunction with the accompanying drawings and the foregoing technical field and background.

BRIEF SUMMARY

A method of operating a vehicle having a friction braking system and a regenerative braking system is presented here. Exemplary embodiments of the method determine a regenerative torque capacity of the vehicle, and calculate a desired regenerative torque amount for the regenerative braking system. The method may continue by detecting that the calculated desired regenerative torque amount exceeds the determined regenerative torque capacity by at least a threshold amount. In response to the detecting, the method controls the actuation of the friction braking system.

Exemplary embodiments of a vehicle are also presented here. The vehicle includes a road wheel, an energy storage system (ESS), an electric motor/generator mechanically coupled to the road wheel and electrically coupled to the ESS, a friction braking system for the road wheel, and a regenerative control system for the ESS. The regenerative control system is operable to implement a method that determines a regenerative torque capacity of the vehicle, calculates a desired regenerative torque amount for the regenerative braking system, and detects that the calculated desired regenerative torque amount exceeds the determined regenerative torque capacity by at least a threshold amount. In response to the detecting, the regenerative control system controls the actuation of the friction braking system.

Another embodiment of a method of operating a vehicle having a friction braking system is also presented. The method determines a coastdown torque capability of the vehicle, calculates a desired coastdown torque amount for the vehicle, and detects that the calculated desired coastdown torque amount exceeds the determined coastdown torque capability by at least a threshold amount. In response to the detecting, the method controls the actuation of the friction braking system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible and non-transitory processor-readable medium in the form of processor-executable instructions that implement the desired functionality and processes described here. Examples of a processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle design, vehicle control systems, regenerative braking systems, electric and hybrid electric drivetrains, conventional drivetrains, clutch systems, and vehicle-based electronic control modules may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
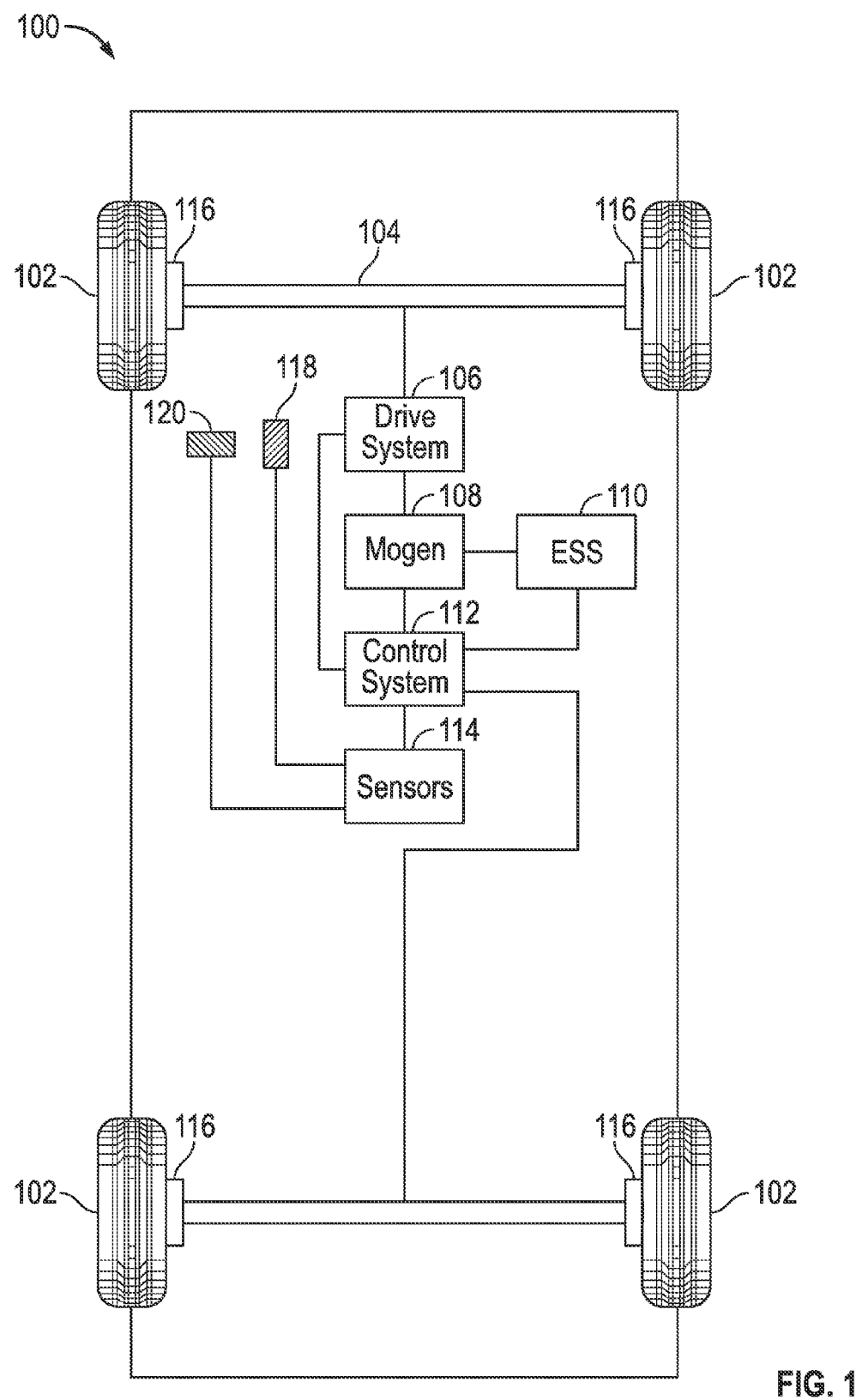
FIG. 1 is a schematic representation of an exemplary embodiment of a vehicle having a regenerative braking system.

FIG. 1 is a schematic representation of an exemplary embodiment of a vehicle 100 having a regenerative braking system. The vehicle 100 may be an HEV, an EV, a plug-in HEV, or any suitably configured vehicle that includes a regenerative braking capability. The vehicle 100 may be a front-wheel drive vehicle, a rear-wheel drive vehicle, an all-wheel drive vehicle, or the like. The non-limiting embodiment illustrated in FIG. 1 represents a front-wheel drive vehicle. The vehicle 100 may include, without limitation: road wheels 102; at least one drive axle 104; a drive system 106; an electric motor/generator (MOGEN) 108; an energy storage system (ESS) 110 for the drive system 106; a computer or processor based control system 112; a number of vehicle sensors 114; a friction braking system 116; an accelerator pedal 118; and a brake pedal 120. The regenerative braking system of the vehicle 100 may be implemented or realized as a combination of various hardware, control, and computer-executable code elements onboard the vehicle 100. For example, the regenerative braking system may include or cooperate with some or all of the following, without limitation: one or more drive axles 104, the drive system 106, the electric MOGEN 108, the control system 112, one or more of the sensors 114, and the friction braking system 116.

FIG. 1 depicts the vehicle 100 in a very simplified manner. It should be appreciated that a practical embodiment of the vehicle 100 will include many additional components, subsystems, and elements that cooperate to provide a variety of conventional and ordinary features and functions. For the sake of brevity and clarity, conventional aspects of the vehicle 100 (which may be unimportant or unrelated to the disclosed subject matter) will not be described in detail here. In this regard, regenerative braking systems and methodologies are described in U.S. Pat. No. 5,615,933 (titled "Electric Vehicle with Regenerative and Anti-Lock Braking") and U.S. Pat. No. 8,190,344 (titled "Optimization of Vehicle Stability and Steering During a Regenerative Braking Event"), both of which are incorporated by reference herein.

The drive system 106 delivers traction power to the drive axle(s) 104. The drive system 106 may include, without limitation, a transmission, a torque converter, and an internal combustion engine (for HEV or plug-in HEV vehicles). For ease of illustration, these components are not depicted in FIG. 1. The drive system 106 is suitably designed and controlled to cooperate with the MOGEN 108 and the ESS 110 such that the road wheels 102 (e.g., the front drive wheels for this example) can be driven by the MOGEN 108 using electric energy stored in the ESS 110. The MOGEN 108, the ESS 110, and/or other features and functions of the vehicle 100 are controlled by the control system 112.

The control system 112, which may be implemented using one or more onboard electronic control modules, is suitably configured to carry out the various techniques, methods, and processes described in more detail below. In this regard, the control system 112 may include or cooperate with one or more control modules for purposes of operating as a regenerative control system for the vehicle 100. In certain embodiments, the functionality of the control system 112 is distributed among a plurality of physically distinct electronic control modules of the vehicle 100. For example, the control system 112 may include or cooperate with one or more of the following, without limitation: a central control module; an engine control module; a transmission control module; a power inverter module; a braking control module; a body control module; a powertrain control module; and a battery control module. These, and possibly other, modules include the control logic and functional capabilities as might be necessary to operate the vehicle 100 in the desired manner. If so configured, the control system 112 can provide overarching control and coordination of some or all of the aforementioned modules. For simplicity, the control system 112 is represented as a single block, although separate distinct components may also be deployed in an embodiment of the vehicle 100.

The control system 112 (and any individual control module onboard the vehicle 100) can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the control system 112 (and any individual control module onboard the vehicle 100) or accessible thereby, including the control algorithms described in more detail below, may be stored in ROM and executed as needed to implement the respective functions.

The ESS 110 can be configured as one or more batteries, although other electrical and/or electrochemical energy storage devices having the ability to store electric power and dispense the electric power can be used here. The ESS 110 can be sized based on factors including regenerative braking requirements, application issues related to typical road grade and temperature, and propulsion requirements such as emissions, power assistance, and electric range. Generally, the ESS 110 is a relatively high-voltage direct current (DC) device coupled to a transmission power inverter module (not shown) via sufficiently constructed and routed DC cabling, as will be understood by those of ordinary skill in the art.

The electric MOGEN 108 is mechanically coupled to at least one of the road wheels 102, and is electrically coupled to the ESS 110. The electric MOGEN 108 can operate alternately as a power supplier or as a power generator. When operating as an electric motor or a power supplier, the MOGEN 108, which may be a single unit or multiple units depending on the design of the vehicle 100, supplies power to the drive system 106. When operating as a generator, the MOGEN 108 will receive electrical power from the drive system 106. In this regard, the control system 112 is adapted to route or distribute electrical energy from the MOGEN 108 to the ESS 110 to recharge the ESS 110, and/or to distribute the electrical energy from the ESS 110 to another electrical power unit (not shown), which will be operating as an electric motor at that time.

The vehicle 100 includes a conventional electromechanical or hydraulic friction braking system 116, which utilizes a fluid-actuated pad and/or drum style brake mechanism positioned in proximity to each road wheel 102. The friction braking system 116 provides a frictional braking torque, which can be augmented by an electronic/regenerative braking torque. When a driver or operator of the vehicle 100 depresses a brake pedal 120 to thereby input a force and travel describing a driver-commanded overall braking torque, the friction braking system 116 slows the vehicle 100 via a combination of the friction braking torque and the regenerative braking torque (if available).

Still referring to FIG. 1, the vehicle 100 is also equipped with various sensors 114 that detect or obtain information related to the current operating state or condition of the vehicle 100. For example, the sensors 114 may include wheel speed sensors that measure wheel speed and wheel slip data (a vehicle speed can be calculated by the control system 112 using the wheel speed data). The sensors 114 may also include sensors that detect the position and/or travel of the brake pedal 120 and the accelerator pedal 118. The sensors 114 may also include sensors that determine the current state of charge of the ESS 110. During operation of the vehicle 100, the control system 112 receives input signals corresponding to the different sensors 114, which may be deployed at various locations onboard the vehicle 100. The sensor data can be gathered and processed at any sampling rate, e.g., once every 10 milliseconds.

The regenerative braking function of the vehicle 100 is usually effective at transforming mechanical energy that is associated with wheel/axle rotation into electrical energy that is used to recharge the ESS 110. The control system 112 indicates a negative regenerative torque that is to be applied such that the MOGEN 108 can generate electricity for the ESS 110. Under certain operating conditions, however, regenerative torque may not be available, resulting in less deceleration than expected. In order to mitigate the loss of regenerative coastdown and braking torque, the control system 112 controls the friction braking system 116 to apply an amount of brake pressure without driver input to achieve the desired amount of deceleration (which would otherwise be caused by operation of the regenerative braking system). The application of friction braking torque can also be controlled in a similar manner to compensate for the lack of regenerative braking torque.

Figure 2:
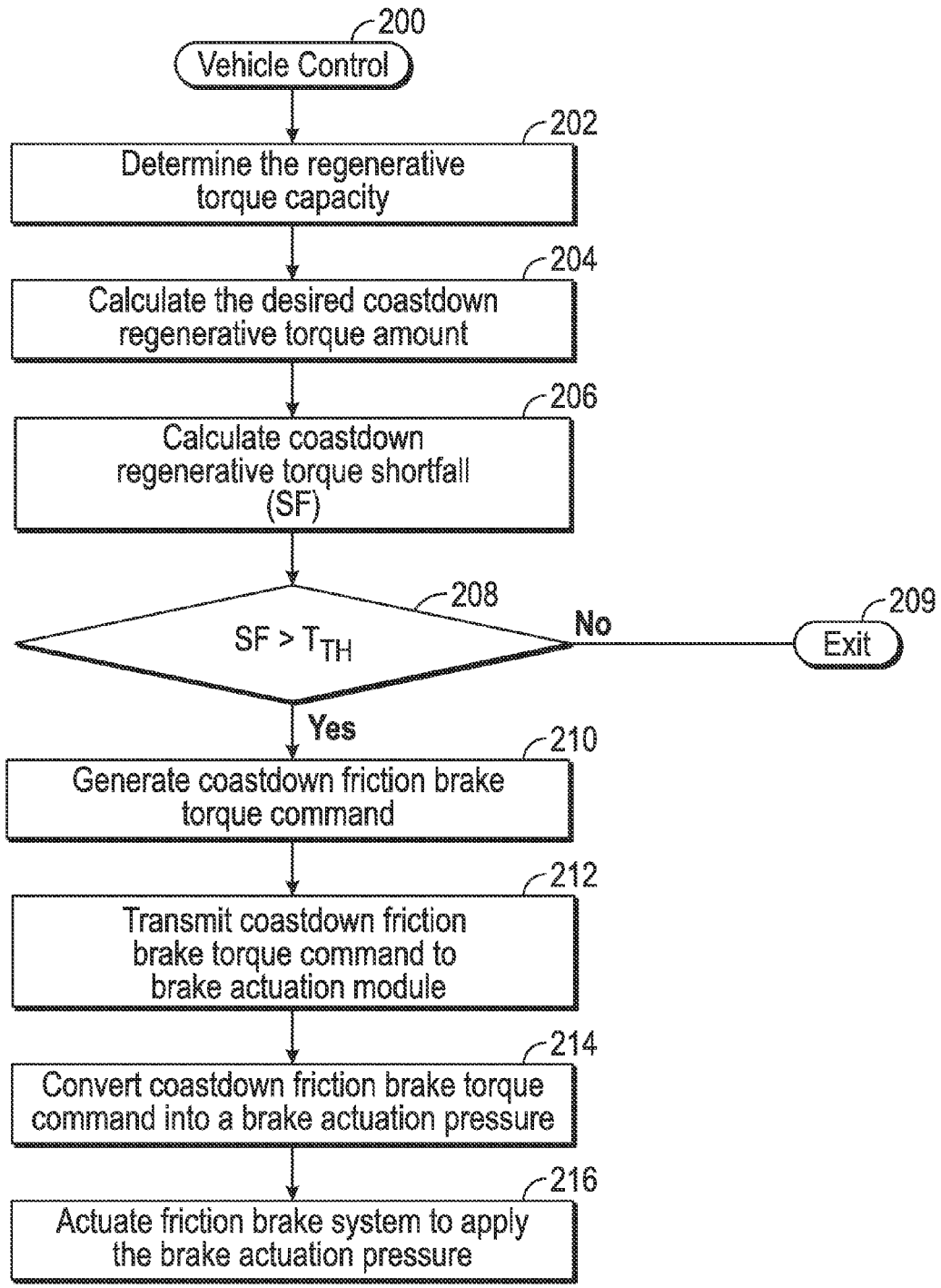
FIG. 2 is a flow chart that illustrates an exemplary embodiment of a vehicle control process.
Figure 3:
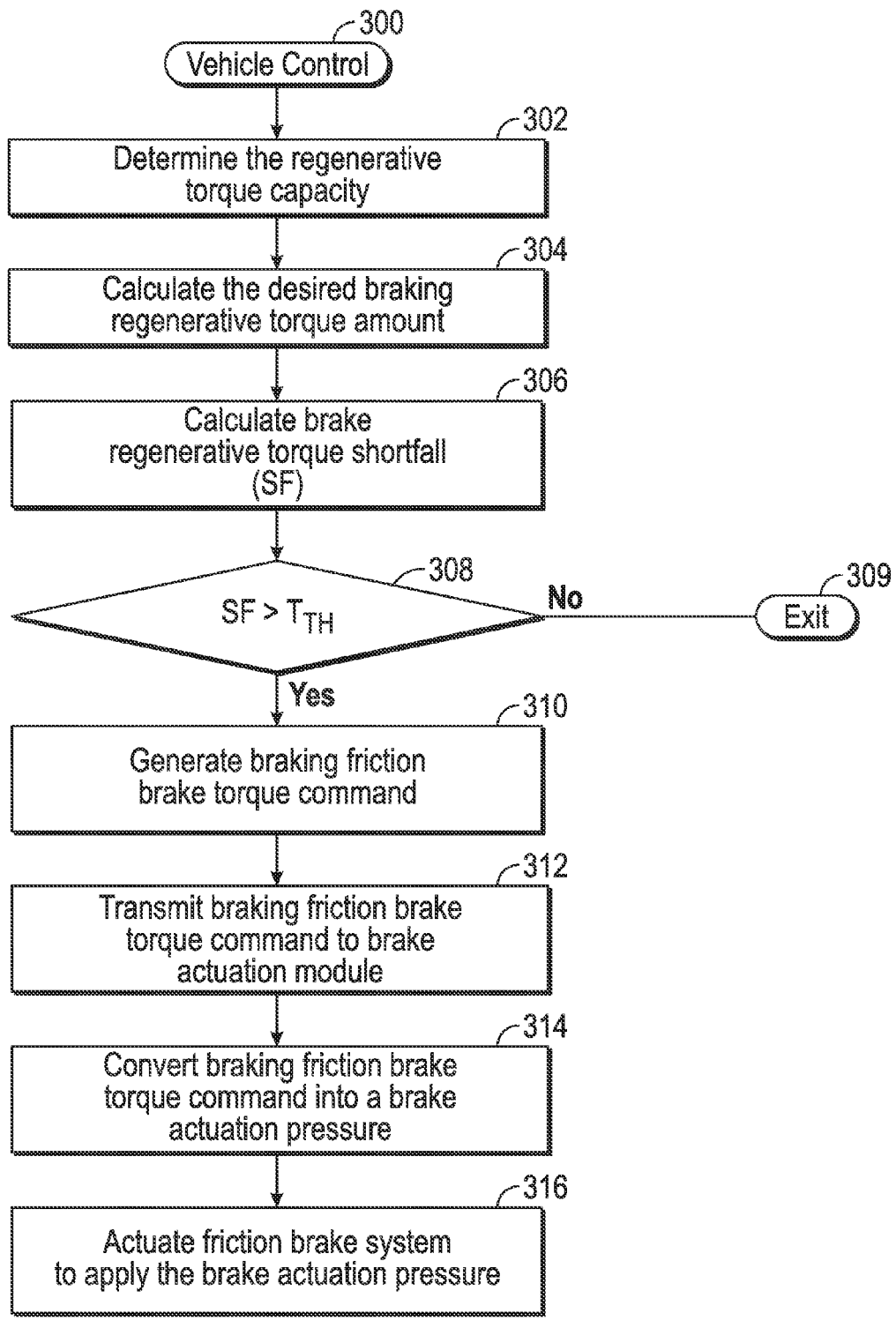
FIG. 3 is a flow chart that illustrates an exemplary embodiment of a vehicle control process.

FIG. 2 is a flow chart that illustrates an exemplary embodiment of a vehicle control process 200, and FIG. 3 is a flow chart that illustrates an exemplary embodiment of a vehicle control process 300. These processes represent exemplary methods of operating a vehicle having a friction braking system and a regenerative braking system. Accordingly, these processes can be performed during operation of the vehicle 100 to normalize deceleration under conditions where regenerative torque is unavailable. The various tasks performed in connection with a described process may be performed by software, hardware, firmware, or any combination thereof. For illustrative purposes, the following description may refer to elements mentioned above in connection with FIG. 1. In practice, portions of a described process may be performed by different elements of the described system, e.g., a sensor, a control module, or the like. It should be appreciated that an illustrated process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted as long as the intended overall functionality remains intact.

Referring now to FIG. 2, an iteration of the process 200 may be initiated at each desired sampling time. The process 200 may begin by determining the regenerative torque capacity of the vehicle (task 202). As used here, "regenerative torque capacity" refers to an amount of regenerative torque that can be safely applied for purposes of recharging the ESS 110 and/or to a desired amount of regenerative torque that has been designated or determined for the current operating state of the vehicle. For example, if the ESS 110 is fully charged, then the regenerative torque capacity will be about zero or extremely limited. In contrast, if the ESS 110 is nearly depleted of electrical energy, then the regenerative torque capacity could be relatively high. As another example, the regenerative torque capacity could be a dynamically adjustable parameter that is influenced by certain detectable operating conditions, vehicle status, operator input, or the like. In this context, it may be desirable to reduce the regenerative torque capacity during a transmission shift to reduce noise and vibration. Task 202 calculates the regenerative torque capacity of the vehicle based on the current operating state of the vehicle. In certain embodiments, task 202 calculates the regenerative torque capacity as a function of the current state of charge of the ESS 110. Task 202 may also calculate the regenerative torque capacity as a function of one or more other parameters, such as wheel slip data received from one or more of the sensors 114.

The process 200 may continue by calculating the desired coastdown regenerative torque amount for the regenerative braking system (task 204). The desired coastdown regenerative torque amount is associated with a coastdown state or condition of the vehicle in that an amount of regenerative torque is normally applied during coastdown to decelerate the vehicle in a way that mimics engine drag in a traditional vehicle that is powered by an internal combustion engine. In certain embodiments, task 204 calculates the desired coastdown regenerative torque amount based on the current operating state of the vehicle. For example, the desired coastdown regenerative torque amount may be calculated as a function of the current vehicle speed and the current position or amount of travel of the accelerator pedal received from one or more of the sensors 114. Thus, task 204 results in an amount of regenerative torque that should be applied to decelerate the vehicle in an appropriate manner.

The process 200 may calculate a coastdown regenerative torque shortfall (SFC) that represents a difference between the desired coastdown regenerative torque amount and the determined regenerative torque capacity (task 206). Although the shortfall can be calculated using any suitable formula or algorithm, the straightforward example described here uses a simple difference. The shortfall gives an indication of whether sufficient regenerative torque is available for purposes of decelerating the vehicle as desired.

If the process 200 detects that the shortfall (SFC) exceeds a threshold torque amount (the "Yes" branch of query task 208), then the process 200 assumes that regenerative braking is unavailable or is otherwise limited. If not (the "No" branch of query task 208), then the process 200 assumes that the desired coastdown regenerative torque amount can be applied and, therefore, the process 200 exits (at reference number 209) such that regeneration, braking, coasting, and other vehicle processes can be performed as usual. The threshold torque amount is desirable for various reasons. For example, it reduces the number of brake activations (which reduces brake life). As another example, a threshold reduces noise that may be associated with the activation of brakes. Moreover, what is "necessary" depends on what the driver can feel. In this regard, a driver usually cannot feel changes in deceleration less than 0.02 g. The driver has some feel for what is "normal" in terms of coastdown deceleration, but there is no need to make the deceleration always equal to what the engine/regeneration would provide. Accordingly, some lowering of deceleration is acceptable from a feel standpoint.

The threshold torque amount may be a static value or a dynamic value that varies as a function of the current vehicle state or condition. For instance, the process 200 may set the threshold torque amount as a function of the current vehicle speed. Although the particular threshold value may vary from one vehicle model to another, and may vary during operation of a given vehicle, the threshold value will typically be within the range of about 100 to 300 N-m.

The "Yes" branch of query task 208 may lead to a task 210, which generates an appropriate coastdown friction brake torque command for purposes of controlling the actuation of the friction braking system. In certain embodiments, task 210 calculates the coastdown friction brake torque command as a function of the current vehicle speed and the current position or amount of travel of the accelerator pedal received from one or more of the sensors 114. In certain embodiments, the coastdown friction brake command could be generated from the desired coastdown regenerative torque amount (which was calculated at task 204), because the process 200 strives to achieve a similar deceleration that would otherwise result from the desired coastdown regenerative torque amount.

The coastdown friction brake torque command is transmitted to the brake actuation module (task 212), which converts the coastdown friction brake torque command into a corresponding brake actuation pressure (task 214). The friction brake system can then be actuated to apply the brake actuation pressure (task 216) during coastdown. Thus, the friction brakes are actuated by a controlled amount to compensate for the lack of regenerative braking capacity or coastdown deceleration.

The process 200 refers to the actuation of friction brakes during coastdown. The process 300 refers to a similar methodology that is utilized during active braking. In practice, the process 300 may be performed sequentially (in any order) with the process 200, or in parallel with the process 200. For clarity, the process 300 is shown and described independently.

Referring now to FIG. 3, an iteration of the process 300 may be initiated at each desired sampling time. The process 300 may begin by determining the regenerative torque capacity of the vehicle (task 302) in the manner described above for task 202. The process 300 may continue by calculating the desired braking regenerative torque amount for the regenerative braking system (task 304). The desired braking regenerative torque amount is associated with an active braking state or condition of the vehicle in that an amount of regenerative torque is normally applied to decelerate the vehicle when the driver depresses the brake pedal. For certain embodiments, task 304 calculates the desired braking regenerative torque amount based on the current operating state of the vehicle. For example, the desired braking regenerative torque amount may be calculated as a function of the current position or amount of travel of the brake pedal as indicated by one or more of the sensors 114. Thus, task 304 results in an amount of regenerative torque that should be applied to decelerate the vehicle in an appropriate manner.

The process 300 may calculate a brake regenerative torque shortfall (SFB) that represents a difference between the desired braking regenerative torque amount and the determined regenerative torque capacity (task 306). Although the shortfall can be calculated using any suitable formula or algorithm, the straightforward example described here uses a simple difference. The shortfall gives an indication of whether sufficient regenerative torque is available for purposes of decelerating the vehicle as desired in response to actuation of the brake pedal.

If the process 300 detects that the shortfall ($SF_B$) exceeds a threshold amount (the "Yes" branch of query task 308), then the process 300 assumes that regenerative braking is unavailable or is otherwise limited. If not (the "No" branch of query task 308), then the process 300 assumes that the desired braking regenerative torque amount can be applied and, therefore, the process 300 exits (at reference number 309) such that regeneration, braking, coasting, and other vehicle processes can be performed as usual. See the comments about SFc above; a threshold amount is used here for reasons described above with reference to query task 208. Here, the threshold amount is utilized such that variability in braking response masks the differences somewhat. If the threshold is set low enough the driver may not notice anyway.

The threshold torque amount for the process 300 may be a static value or a dynamic value that varies as a function of the current vehicle state or condition, and it may be different than the threshold torque amount used for the process 200. For instance, the process 300 may set its threshold torque amount as a function of the current vehicle speed. Although the particular threshold value may vary from one vehicle model to another, and may vary during operation of a given vehicle, this threshold value will typically be within the range of about 20 to 100 N-m.

The "Yes" branch of query task 308 may lead to a task 310, which generates an appropriate braking friction brake torque command for purposes of controlling the actuation of the friction braking system. For certain embodiments task 310 calculates the braking friction brake torque command as a function of the current position or amount of travel of the brake pedal. In certain embodiments, the braking friction brake command could be generated from the desired braking regenerative torque amount (which was calculated at task 304), because the process 300 strives to achieve the same deceleration that would otherwise result from the desired braking regenerative torque amount.

The braking friction brake torque command is transmitted to the brake actuation module (task 312), which converts the braking friction brake torque command into a corresponding brake actuation pressure (task 314). The friction brake system can then be actuated to apply the brake actuation pressure (task 316) during the braking maneuver. Thus, the friction brakes are actuated by a controlled amount to compensate for the lack of regenerative braking capacity.

As mentioned above, the process 200 (which is associated with coastdown) and the process 300 (which is associated with active braking) may be performed concurrently or sequentially. In certain embodiments, the brake actuation pressure (if any) obtained at task 214 is added to the brake actuation pressure (if any) obtained at task 314 such that the friction brake system is actuated in a way that contemplates the adjustments made by both processes. Thus, if the vehicle is coasting and the driver is not depressing the brake pedal, then only the coastdown friction brake command (from task 214) will contribute to the brake actuation pressure. In contrast, if the driver is actively braking, then the overall brake actuation pressure may be derived from both the coastdown friction brake command (from task 214) and the braking friction brake command (from task 314).

Figure 4:
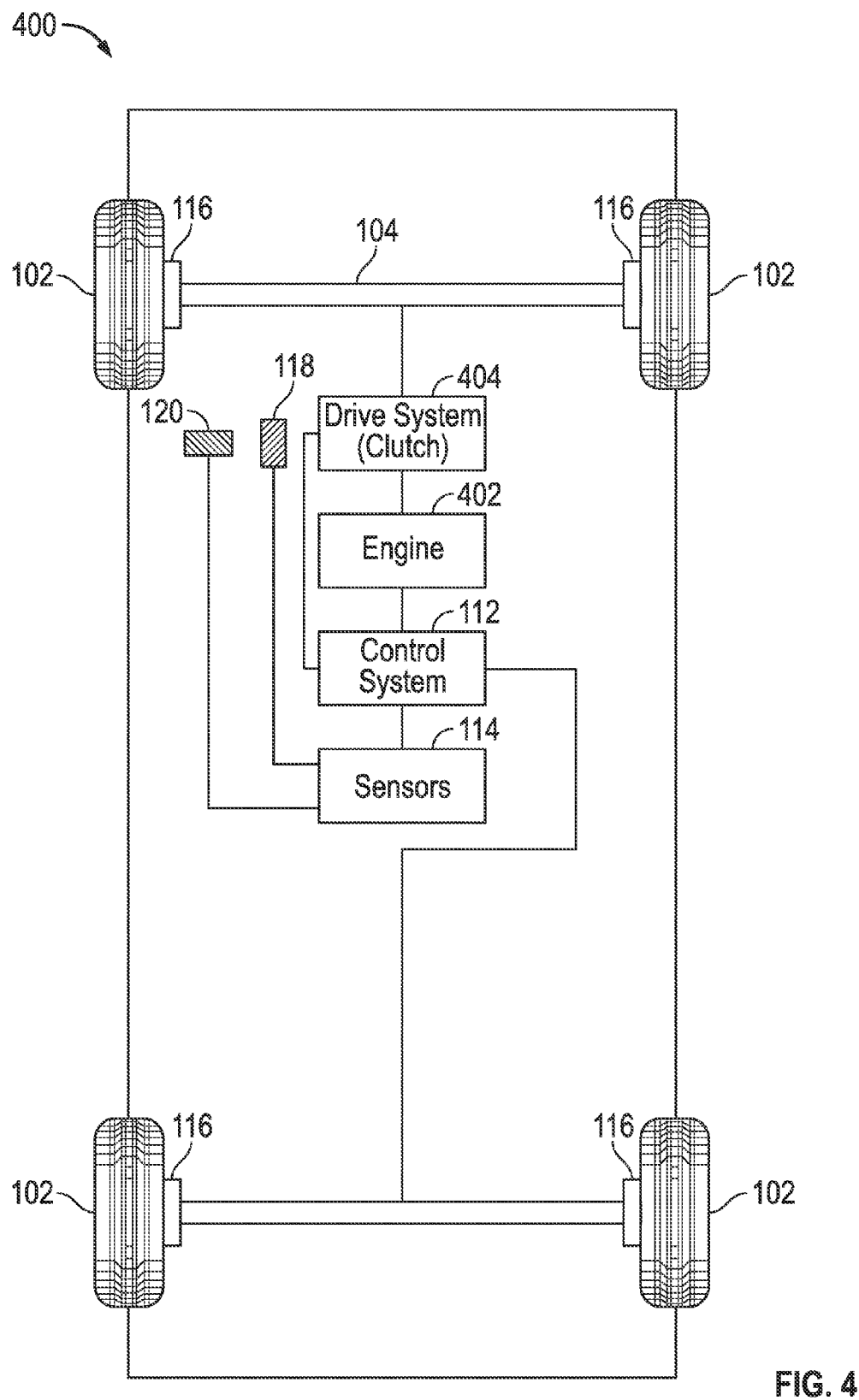
FIG. 4 is a schematic representation of an exemplary embodiment of a vehicle having a dual dry clutch transmission.

The methodologies described above may also be utilized in certain traditional (non-hybrid, non-electric) vehicles, e.g., an automobile having an engine and a dry clutch transmission. In this regard, FIG. 4 is a schematic representation of an exemplary embodiment of a vehicle 400 having an engine 402 and a drive system 404 that includes a clutch transmission mechanism, such as a dual dry clutch transmission. The vehicle 400 shares many of the features, components, and functionality described above in the context of the vehicle 100 (see FIG. 1). For this reason, many of the reference numbers from FIG. 1 are also used in FIG. 4 to indicate the same or equivalent elements. Such common features and functionality will not be redundantly described here with reference to the vehicle 400.

The vehicle 400 represents a "traditional" automobile having an internal combustion engine 402 that generates torque for the drive wheels, wherein the drive torque is applied in a controlled manner via the drive system 404. The drive system 404 includes a suitably configured clutch mechanism that delivers traction power to the drive axle(s) 104. In certain implementations, the drive system 404 includes or cooperates with a dry clutch mechanism. It some embodiments, the drive system 404 includes or cooperates with a dual dry clutch transmission, as is well understood by those familiar with vehicle design concepts.

Under some operating conditions and scenarios, the coastdown capability of the powertrain in the vehicle 400 can be compromised. For example, heating of the dual dry clutches, transmission gear shifts, changes to air and fuel ratios caused by engine emissions algorithms, the limiting of negative engine torque to reduce driveline lash noise vibration and harshness (NVH), and other conditions may impact the coastdown characteristics of the vehicle 400. More specifically, the usual coastdown deceleration may be reduced or rendered unavailable in response to clutch heating. In such situations, the vehicle 400 may activate the friction brake system in a controlled manner such that the driver experiences the usual coastdown deceleration.

The process 200 can be modified as needed for deployment in the vehicle 400 to address variations in coastdown deceleration. For example, rather than determining the regenerative torque capacity (task 202), the vehicle 400 may determine a coastdown torque capability based on the current operating state or conditions of the vehicle 400. The determined coastdown capability may be influenced by various factors or parameters, such as, without limitation: the clutch temperature, the speed of the vehicle, engine temperature, catalytic converter temperature, the transmission gear, accelerator pedal position, and engine speed. Under typical operating conditions, the vehicle 400 exhibits predicable deceleration during coastdown. If, however, the current operating conditions might impact the coastdown deceleration, then the control process can determine the actual coastdown torque capability of the vehicle as a function of the current operating state.

The control process can then calculate a desired coastdown torque amount (similar to that described above for task 204), calculate the coastdown torque shortfall (similar to that described above for task 206), and compare the calculated coastdown torque shortfall to a threshold torque amount (similar to that described above for query task 208). Thereafter, the remainder of the process 200 can be performed as described above to actuate the friction brake system as needed. Activating the friction brake system in this manner compensates for the loss of expected coastdown deceleration, such that the driver perceives little to no difference in actual deceleration during coastdown maneuvers.

If the driver depresses the brake pedal during coastdown, then the coastdown friction brake torque command can be combined (summed) with the driver-initiated friction brake torque command. In some situations, when the driver depresses the brake pedal, the amount of braking is sufficient such that the compensation for loss of coastdown deceleration may be suspended. Thus, whether or not the driver applies the brakes during coastdown, the vehicle control process for conventional (non-hybrid and non-electric) vehicles generates compensating friction brake pressure as needed to provide the usual and expected deceleration.

The techniques presented here can be utilized to normalize deceleration of a vehicle in which regenerative braking torque or coastdown deceleration may decrease or be lost. Vehicle deceleration remains consistent and predictable regardless of the current state of charge of the high voltage ESS, transmission clutch temperature, etc. This allows full charging of the ESS and eliminates the need for a "regeneration buffer" at the top end of the charging range. Moreover, the methodologies presented here enable higher levels of coastdown regenerative torque to accommodate "one pedal" driving habits. The normalizing techniques also provide certain benefits during activations of the anti-lock braking system of the vehicle. In this context, friction braking can be regulated in the presence of wheel slip on a driven axle, thus compensating for the reduction in coastdown regenerative torque. Such regulation rebalances torque to all the road wheels (using the friction brakes), which in turn improves vehicle dynamics.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a vehicle having a friction braking system and a regenerative braking system, the method comprising:
   determining a regenerative torque capacity of the vehicle;
   calculating a desired regenerative torque amount for the regenerative braking system;
   setting a threshold amount as a function of vehicle speed;
   detecting that the calculated desired regenerative torque amount exceeds the determined regenerative torque capacity by at least the threshold amount; and
   in response to the detecting, controlling actuation of the friction braking system.

2. The method of claim 1, wherein the determined regenerative torque capacity is based on a current operating state of the vehicle.

3. The method of claim 1, wherein the calculated desired regenerative torque amount is based on a current operating state of the vehicle.

4. The method of claim 1, wherein the calculating calculates a desired coastdown regenerative torque amount that corresponds to a coastdown state of the vehicle.

5. The method of claim 4, wherein the calculating calculates the desired coastdown regenerative torque amount as a function of vehicle speed and accelerator pedal travel.

6. The method of claim 1, wherein the calculating calculates a desired braking regenerative torque amount that corresponds to an active braking state of the vehicle.

7. The method of claim 6, wherein the calculating calculates the desired braking regenerative torque amount as a function of brake pedal travel.

8. The method of claim 1, wherein the threshold amount is a static value.

9. A vehicle comprising:
   a road wheel;
   an energy storage system (ESS);
   an electric motor/generator mechanically coupled to the road wheel and electrically coupled to the ESS;
   a friction braking system for the road wheel; and
   a regenerative control system for the ESS, wherein the regenerative control system is operable to implement a method comprising:
   determining a regenerative torque capacity of the vehicle;
   calculating a desired regenerative torque amount for the regenerative braking system;
   setting a threshold amount as a function of vehicle speed;
   detecting that the calculated desired regenerative torque amount exceeds the determined regenerative torque capacity by at least the threshold amount; and
   in response to the detecting, controlling actuation of the friction braking system.

10. The vehicle of claim 9, wherein the calculating calculates a desired coastdown regenerative torque amount that corresponds to a coastdown state of the vehicle.

11. The vehicle of claim 10, wherein:
    the calculating calculates the desired coastdown regenerative torque amount as a function of vehicle speed and accelerator pedal travel; and
    controlling actuation of the friction braking system comprises:
    generating a friction brake torque command as a function of vehicle speed and accelerator pedal travel; and
    actuating the friction braking system in response to the friction brake torque command.

12. The vehicle of claim 9, wherein the calculating calculates a desired braking regenerative torque amount that corresponds to an active braking state of the vehicle.

13. The vehicle of claim 12, wherein:
    the calculating calculates the desired braking regenerative torque amount as a function of brake pedal travel; and
    controlling actuation of the friction braking system comprises:
    generating a friction brake torque command as a function of brake pedal travel; and
    actuating the friction braking system in response to the friction brake torque command.

14. A method of operating a vehicle having a friction braking system, the method comprising:
    determining a coastdown torque capability of the vehicle;
    calculating a desired coastdown torque amount for the vehicle;
    setting a threshold amount as a function of vehicle speed;
    detecting that the calculated desired coastdown torque amount exceeds the determined coastdown torque capability by at least the threshold amount; and
    in response to the detecting, controlling actuation of the friction braking system.

15. The method of claim 14, wherein the determined coastdown torque capability is based on a current operating state of the vehicle.

16. The method of claim 14, wherein the calculated desired coastdown torque amount is based on a current operating state of the vehicle.

17. The method of claim 14, wherein the calculating calculates the desired coastdown torque amount as a function of vehicle speed and accelerator pedal travel.

18. The method of claim 14, wherein the threshold amount is a static value.

* * * * *